United States Patent
Lee et al.

(10) Patent No.: US 9,039,537 B2
(45) Date of Patent: May 26, 2015

(54) LIGHT GUN AND METHOD FOR DETERMINING SHOT POSITION

(71) Applicant: Zhongshan Innocloud Intellectual Property Services Co., Ltd., New Taipei (TW)

(72) Inventors: Hou-Hsien Lee, New Taipei (TW); Chang-Jung Lee, New Taipei (TW); Chih-Ping Lo, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 332 days.

(21) Appl. No.: 13/693,051

(22) Filed: Dec. 4, 2012

(65) Prior Publication Data
US 2013/0310123 A1    Nov. 21, 2013

(30) Foreign Application Priority Data
May 16, 2012    (TW) .................................. 101117304

(51) Int. Cl.
*A63F 13/04*     (2006.01)
*A63F 13/219*    (2014.01)
*A63F 13/213*    (2014.01)
*A63F 13/426*    (2014.01)

(52) U.S. Cl.
CPC ............... *A63F 13/04* (2013.01); *A63F 13/219* (2014.09); *A63F 13/213* (2014.09); *A63F 13/426* (2014.09)

(58) Field of Classification Search
CPC combination set(s) only.
See application file for complete search history.

(56) References Cited

U.S. PATENT DOCUMENTS

| | | | | |
|---|---|---|---|---|
| 6,292,171 | B1* | 9/2001 | Fu et al. .................... | 345/156 |
| 6,296,486 | B1* | 10/2001 | Cardaillac et al. ............ | 434/12 |
| 2001/0010514 | A1* | 8/2001 | Ishino .................... | 345/158 |
| 2003/0078105 | A1* | 4/2003 | Hao ........................ | 463/51 |
| 2004/0048663 | A1* | 3/2004 | Cheng et al. .............. | 463/36 |
| 2005/0104849 | A1* | 5/2005 | Hoile ...................... | 345/157 |
| 2005/0107160 | A1* | 5/2005 | Cheng et al. .............. | 463/37 |
| 2006/0258465 | A1* | 11/2006 | Lin et al. .................. | 463/49 |
| 2009/0153479 | A1* | 6/2009 | Gu et al. .................. | 345/158 |

FOREIGN PATENT DOCUMENTS

TW    588258    5/2004

* cited by examiner

*Primary Examiner* — Van Chow
(74) *Attorney, Agent, or Firm* — Novak Druce Connolly Bove + Quigg LLP (57) ABSTRACT

In a method for determining a shot position of a light gun on a display screen, a current image is captured by an image capturing device of the light gun. The method detects a screen area in the current image, calculates coordinates of an aimed point of the light gun on the display screen when the screen area has been detected, and transmits the coordinates of the aimed point of the light gun to a host computer so that a shot result of the light gun is displayed on the display screen by the host computer according to the coordinates of the aimed point of the light gun on the display screen.

18 Claims, 10 Drawing Sheets

LIGHT GUN AND METHOD FOR DETERMINING SHOT POSITION

BACKGROUND

1. Technical Field

Embodiments of the present disclosure relate to game control technology, and particularly to a light gun and a method for determining a shot position of the light gun on a display screen.

2. Description of Related Art

Light guns are used to play a shot game on a cathode-ray tube (CRT) display screen; however, the light gun cannot be used on a liquid-crystal display (LCD) screen. Generally, there are two methods to solve this problem. In a first method, a preset pixel block of a specified color is added in the LCD screen, where the preset pixel of the specified color is used to recognize a shot position of the light gun on the LCD screen. In a second method, special light equipments, such as light-emitting diode (LED) lamp holders, are positioned beside the LCD screen, then infrared rays omitted by the LED lamp holders are used to focus with infrared rays omitted by a lens of an infrared camera positioned on the light gun, to determine the shot position of the light gun on the LCD screen.

However, in the first method, the pixel color in the shot game will inflect influence the accuracy of recognizing the shot position of the light gun on the LCD screen. In the second method, the accuracy of recognizing the shot position of the light gun is also influenced when install positions of the LED lamp holders are not suitably, and it is inconvenient for a user of the light gun because the infrared rays omitted by the LED lamp holders will disturb the sightline of the user. Therefore, an efficient method for determining a shot position of a light gun on a display screen is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
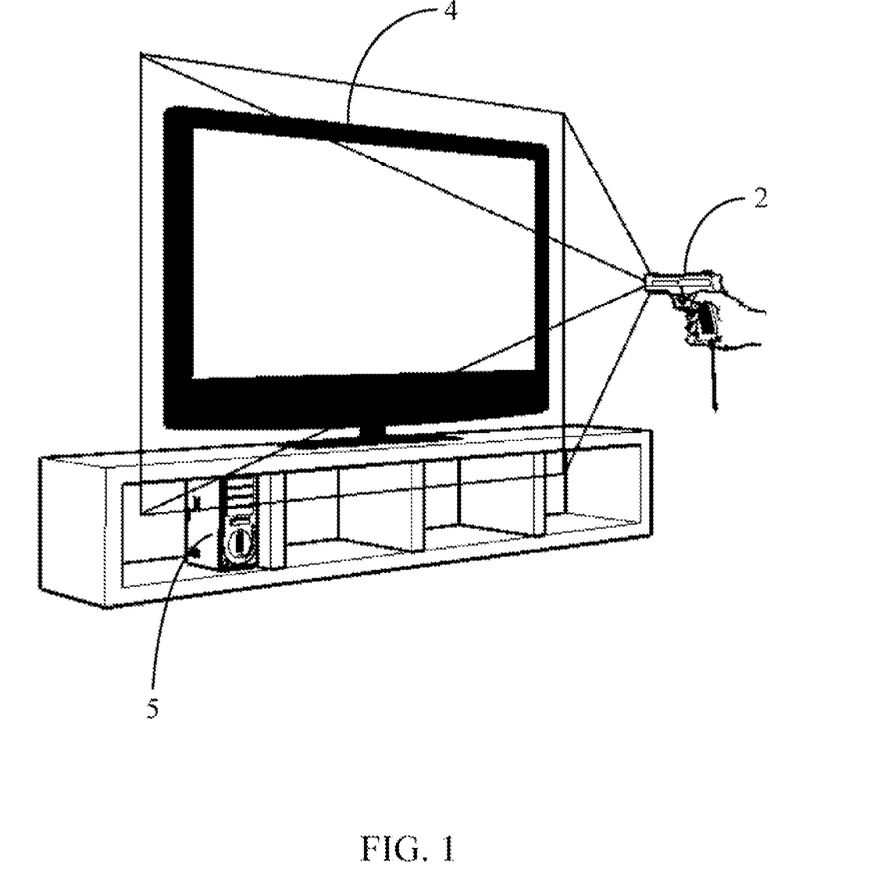
FIG. 1 is a schematic diagram of an example of a shot game on a display screen using a light gun.

FIG. 1 is a schematic diagram of an example of a shot game on a display screen 4 using a light gun 2. In one embodiment, the light gun 2 is connected to a host computer 5 through a network (e.g., a wireless network), the host computer 5 is further connected to the display screen 4 through a data cable or the network. The display screen 4 may be a cathode-ray tube (CRT) display screen or a liquid-crystal display (LCD) screen.

Figure 2:
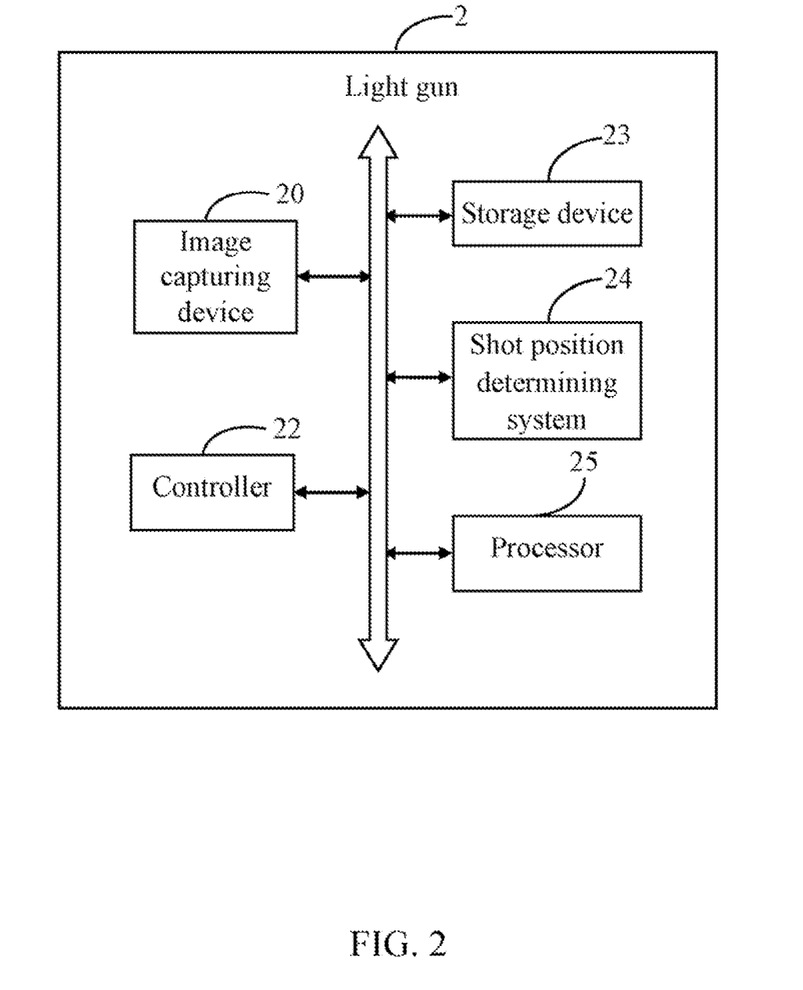
FIG. 2 is a schematic diagram of one embodiment of a light gun including a shot position determining system.

FIG. 2 is a block diagram of one embodiment of the light gun 2 including a shot position determining system 24. The light gun 2 further includes an image capturing device 20, a controller (e.g., a trigger) 22, a storage device 23, and at least one processor 25. It should be understood that FIG. 2 illustrates only one example of the light gun 2 that may include more or fewer components than illustrated, or a different configuration of the various components in other embodiments.

In one embodiment, the image capturing device 20 may be positioned in front of the light gun 2 (e.g., near to a gunpoint). The image capturing device 20 may be a depth-sensing camera, such as a time-of-flight (TOF) camera. In this embodiment, the image capturing device 20 is a camera system that captures a distance from a target object in an image captured by a lens of the image capturing device 20 (distance information) using the TOF principle. The image capturing device 20 can obtain a distance between the lens and each point on the target object that has been captured. Thus, each image captured by the image capturing device 20 includes distance information between the lens and each point on the target object in the image.

In one embodiment, the image capturing device 20 captures a digital image (hereinafter referred to as "image") of the display screen 4 when the shot game is played on the display screen 4 using the light gun 2, and stores the captured image in the storage device 23. The shot position determining system 24 detects a screen area 40 in the captured image, calculates coordinates of an aimed point (or target point) of the light gun 2 on the display screen 4 upon the condition that the screen area 40 has been detected, and transmits the coordinates of the aimed point of the light gun 2 to the host computer 5. The host computer 5 displays a point (shot result) on the display screen 4 according to the coordinates of the aimed point of the light gun 2 on the display screen 4. In one embodiment, the screen area 40 may be a rectangle enclosing the display screen 4 (see FIG. 7).

In one embodiment, the storage device 23 stores images of the display screen 4 and an image template of the display screen 4 (hereinafter referred to as "screen template"). The images in this embodiment are three dimensional (3D) images which are captured by the image capturing device 20. In one embodiment, the images may include frontal images, for example. A frontal image of the display screen 4 is an image captured when the display screen is facing the image capturing device 20. Depending on the embodiment, the storage device 23 may be a smart media card, a secure digital card, a compact flash card, or any other memory storage device.

The shot position determining system 24 is used to receive the image (i.e., the 3D image) from the image capturing device 20, and compare the image with the screen template to determine whether the image includes an image sub-area, which is defined as an outline of the display screen 4. If the image includes such an image sub-area, the shot position determining system 24 determines that the image includes the display screen 4, and calculates the coordinates of the aimed point of the light gun 2 on the display screen 4, and transmits the calculated coordinates to the host computer 5. In one embodiment, the shot position determining system 24 may include computerized instructions in the form of one or more programs that are executed by the at least one processor 25 and stored in the storage device 23 (or memory). A detailed description of the shot position determining system 24 will be given in the following paragraphs.

Figure 3:
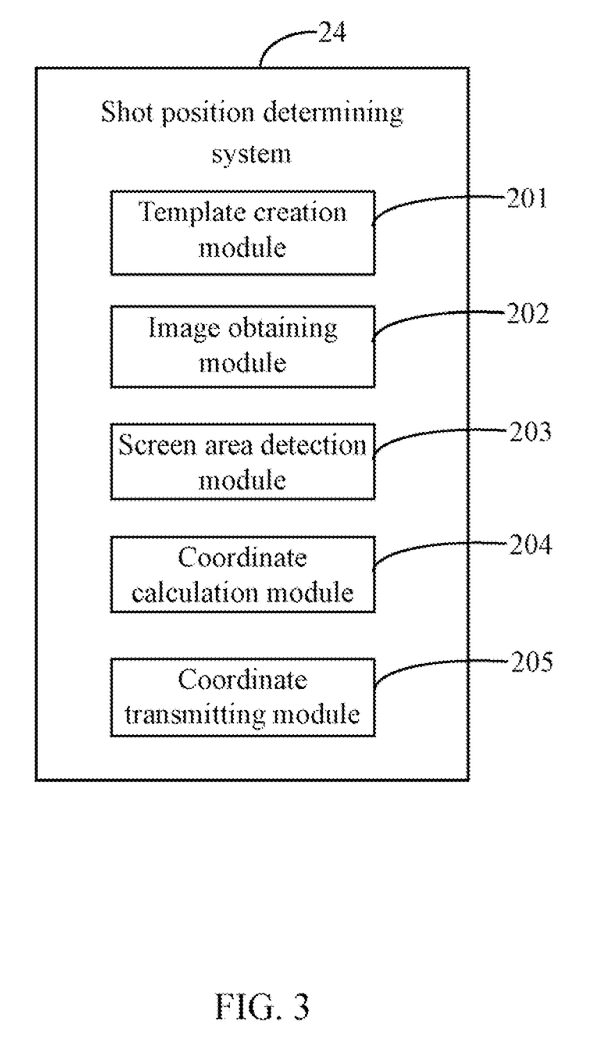
FIG. 3 is a schematic diagram of function modules of the shot position determining system included in the light gun.

FIG. 3 is a block diagram of function modules of the shot position determining system 24 included in the light gun 2. In one embodiment, the shot position determining system 24 may include one or more modules, for example, a template creation module 201, an image obtaining module 202, a screen area detection module 203, a coordinate calculation module 204, and a coordinate transmitting module 205. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 4:
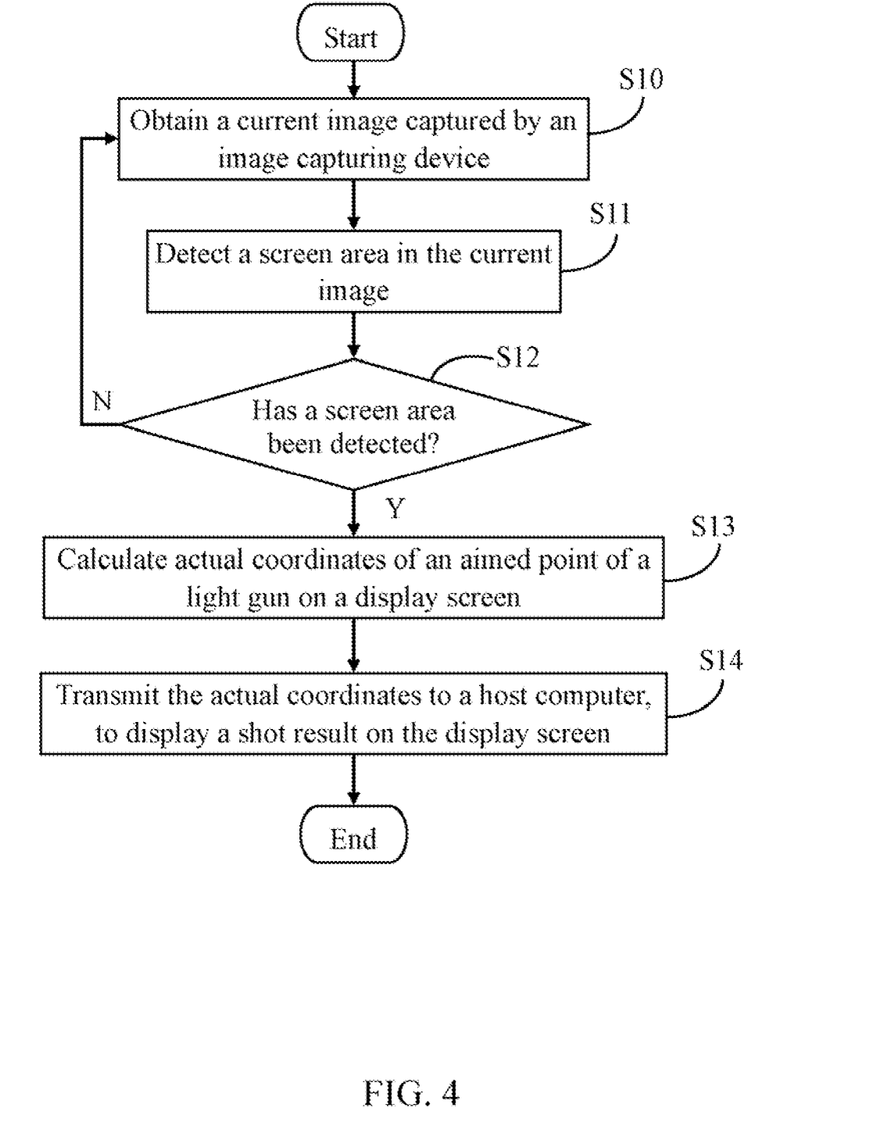
FIG. 4 is a flowchart of one embodiment of a method for determining a shot position of the light gun on the display screen.

FIG. 4 is a flowchart of one embodiment of a method for determining a shot position of the light gun 2 on the display screen 4. Depending on the embodiment, additional steps may be added, others removed, and the ordering of the steps may be changed.

Before implementing the flow shown in FIG. 4, the template creation module 201 creates a screen template according to the distance between the lens of the image capturing device 20 and each point of the image of the display screen 4. A detailed description is as follows.

Figure 5:
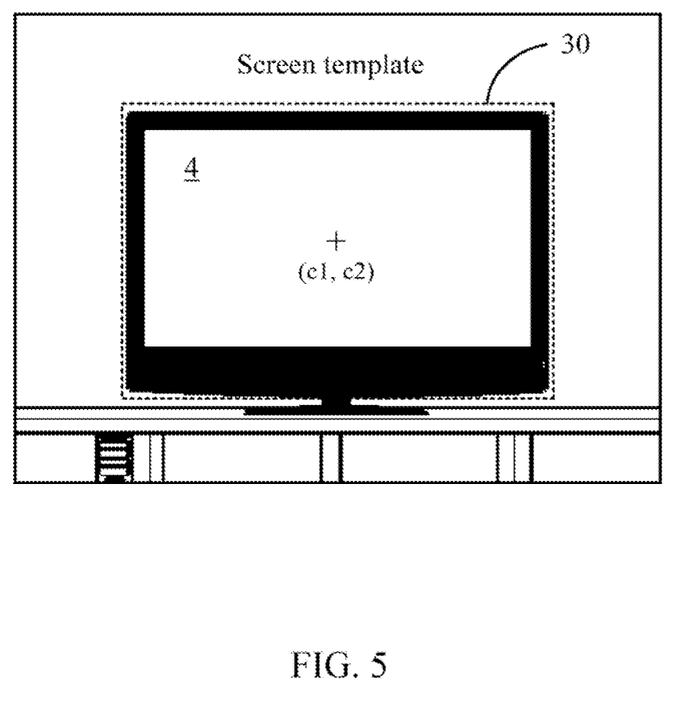
FIG. 5 is a schematic diagram of an example of creating a screen template.

The image capturing device 20 obtains a reference image of the display screen 4 (as shown in FIG. 5), and the template creation module 201 determines a preset area 30 in the reference image. As shown in FIG. 5, the preset area 30 may be a smallest rectangle (represented by a dashed rectangle) enclosing the display screen 4. In one embodiment, a center "c1" of the display screen 4 in the reference image is overlapped with a center "c2" of the reference image. A size of the preset area is determined to be 320*240 (width*height), and a ratio between the width and the height is determined to be 4:3, however, it should be appreciated that other ratios such as 16:9 may be appropriate in other situations.

A position of the aimed point of the light gun 2 may be adjusted to ensure that the display screen 4 in the reference image falls in the preset area 30, and an occupied ratio of the display screen 4 in the preset area 30 is greater than a preset ratio (e.g., 95%). The image capturing device 20 transmits the reference image to the template creation module 201 when the controller (e.g., the trigger) 22 of the light gun 2 is enabled.

The template creation module 201 determines a reference distance between the lens of the image capturing device 20 and the display screen 4 in the preset area 30, stores the reference distance in the screen template of the display screen 4, and further stores the screen template in the storage device 23. The screen template includes a sub-image of the preset area 30 enclosing the display screen 4 and the reference distance. In one embodiment, the reference distance is determined as a distance between the lens of the image capturing device 20 and a feature point in the preset area 30. For example, the feature point may be a center point of the preset area 30.

Figure 6:
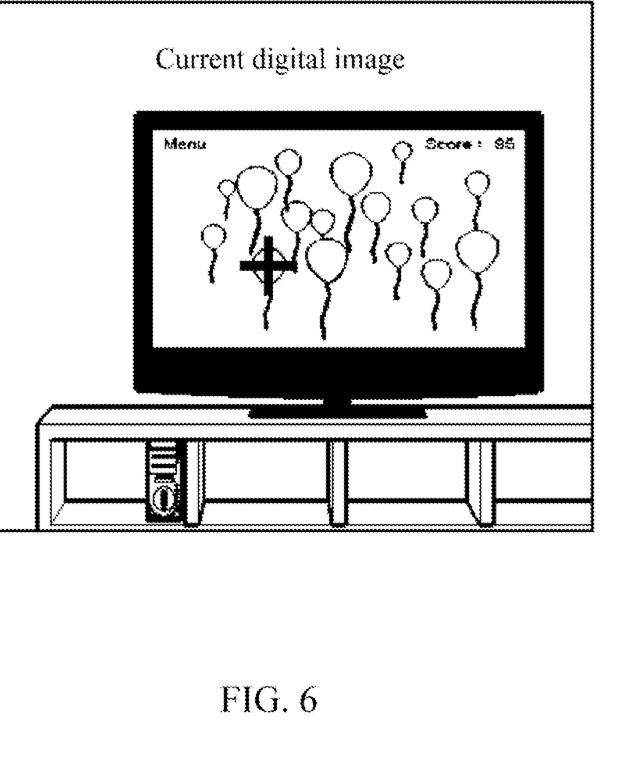
FIG. 6 shows an example of a current image captured by an image capturing device positioned on the light gun.

In block S10, the image obtaining module 202 obtains a current image captured by the image capturing device 20 of the light gun 2 at each preset time interval (e.g., one second). An example of the current image is shown in FIG. 6.

Figure 7:
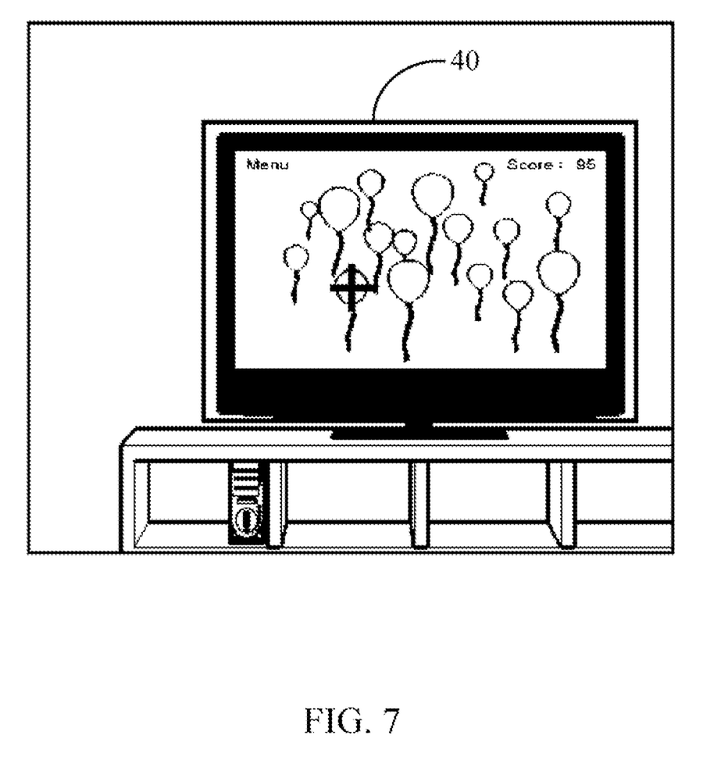
FIG. 7 is a schematic diagram of an example of detecting a screen area in the current image.

In block S11, the screen area detection module 203 detects a screen area 40 in the current image (as shown in FIG. 7) by comparing the screen template with the current image. A detailed description is provided as follows.

The screen area detection module 203 obtains the reference distance from the screen template, a reference ratio between the width and the height of the display screen 4 in the screen template, and a reference size of the display screen 4 in the screen template. In one embodiment, the reference ratio is determined to be a ratio between the width and the height of the preset area 30 enclosing the display screen 4, and the reference size is determined to be a size of the preset area 30 enclosing the display screen. For example, when the size of the preset area 30 is 320*240 (W*H), the reference ratio is determined to be 4:3.

The screen area detection module 203 determines whether the current image has the screen area 40 by determining whether an image sub-area (a sub-area of the current image) has a specified number of points in the current image. For example, suppose that the image sub-area may store a number Q1 of points, and the specified number may be set as Q1*90%. In this embodiment, the screen area detection module 203 obtains a current distance between each of the specified number of points and the lens of the image capturing device 20, a current ratio between the width and the height of the image sub-area, and a current size of the image sub-area. If each of the current distances is equal to the reference distance, the current ratio is equal to the reference ratio (e.g., 4:3), and the current size is equal to the reference size, then the screen area detection module 203 determines that the image sub-area is the screen area 40 detected in the current image. For example, as shown in FIG. 7, the rectangle represents the screen area 40 detected in the current image.

In other embodiment, if a first deviation value between each of the current distances and the reference distance falls in a first preset range (e.g., [−5%, 5%]), a second deviation value between the current ratio and the reference ratio falls in a second preset range (e.g., [−4%, 4%]), and a third deviation value between the current size and the reference size falls in a third preset range (e.g., [−2%, 2%]), the screen area detection module 203 determines that the image sub-area is the screen area 40 detected in the current image.

In block S12, the screen area detection module 203 determines whether the screen area 40 has been detected in the current image. If the screen area 40 has been detected in the current images, the procedure goes to block S13. If the screen area 40 has not been detected in the current image, the procedure returns to block S10.

In block S13, the coordinate calculation module 204 calculates actual coordinates of the aimed point of the light gun 2 on the display screen 4 according to a virtual size of the screen area 40 and an actual size of the display screen 4, and stores the actual coordinates in the storage device 23. In one embodiment, the actual coordinates are determined to be a shot position of the light gun 2 of the shot game on the display screen 4. A detailed description is as follows.

Figure 8:
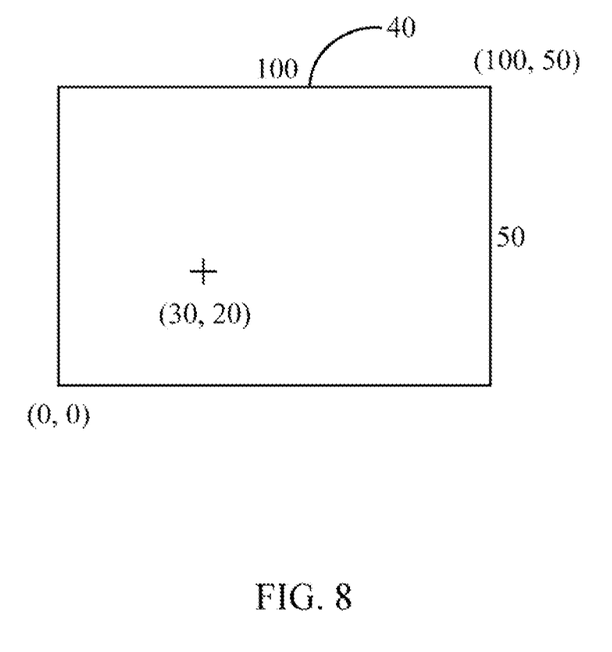
FIG. 8 is a schematic diagram of an example of virtual coordinates of an aimed point of the light gun in the detected screen area.

The coordinate calculation module 204 creates a virtual coordinate system of the screen area 40, and obtains virtual coordinates of the aimed point of the light gun 2 in the screen area 40 (i.e., the virtual coordinate system). In one embodiment, an origin of the virtual coordinate system is a point in the bottom left of the screen area 40, and the aimed point of the light gun 2 is determined to be the center of the current image. As shown in FIG. 8, the virtual size of the screen area 40 is 100*50, and the virtual coordinates of the aimed point of the light gun 2 in the screen area 40 are determined to be (30, 20) by comparing the positions between the aimed point and the origin of the virtual coordinate system.

Figure 9:
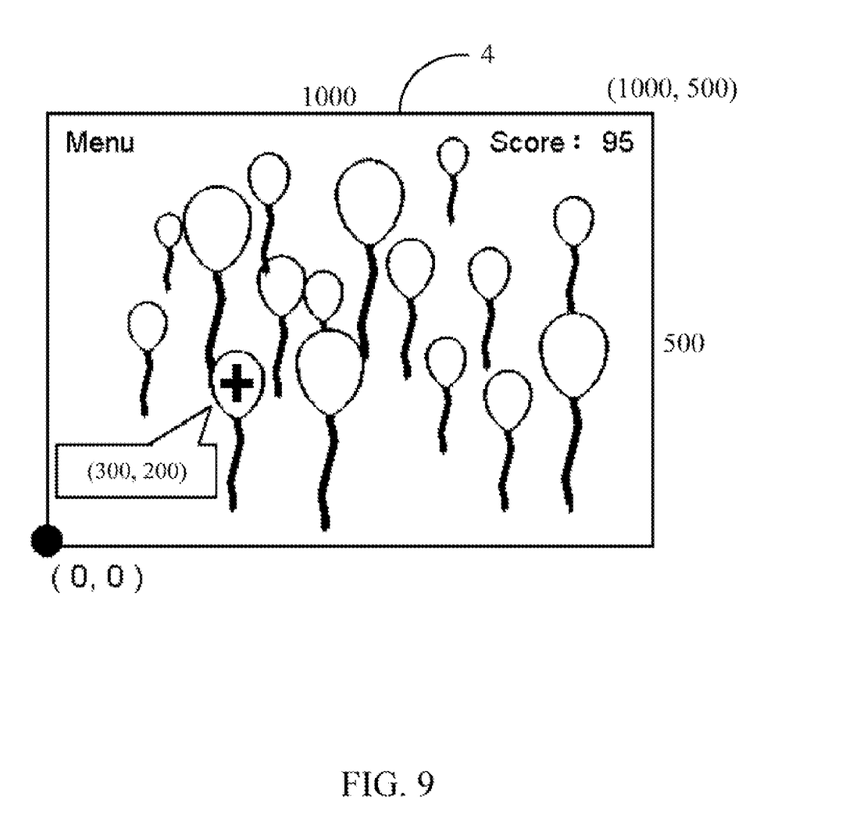
FIG. 9 is a schematic diagram of an example of transforming the virtual coordinates to actual coordinates of the aimed point of the light gun on the display screen.

The coordinate calculation module 204 creates an actual coordinate system of the display screen 4, and transforms the virtual coordinates to the actual coordinates of the aimed point of the light gun 2 on the display screen 4 (i.e., the actual coordinate system) according to a ratio between the virtual size of screen area 40 and the actual size of the display screen 4. For example, if the actual size of the display screen 4 is 1000*500, the ratio is determined as 10:1, and the actual coordinates of the aimed point of the light gun 2 on the display screen 4 are determined to be (300, 200).

Figure 10:
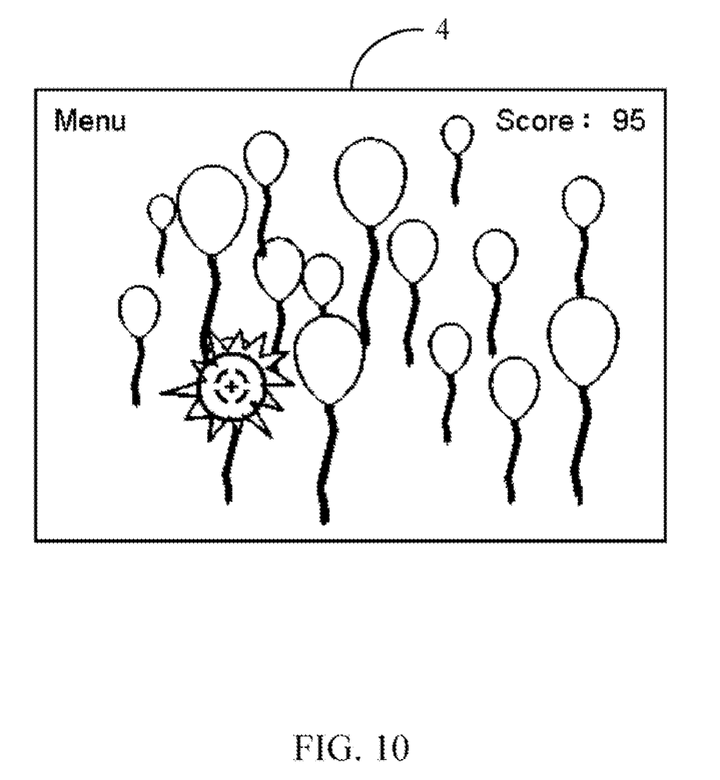
FIG. 10 is a schematic diagram of an example of displaying a shot result on the display screen according to the actual coordinates of the aimed point of the light gun on the display screen.

In block S14, the coordinate transmitting module 205 transmits the actual coordinates to the host computer 5 in response to receiving a shot command of the light gun 2 (e.g., the trigger of the light gun 2 is enabled). The host computer 5 displays a shot result on the display screen 4 according to the actual coordinates of the aimed point of the light gun 2 on the display screen 4. An example of the shot result is shown in FIG. 10. For example, the shot result may be include a point on the display screen 4 corresponding to the actual coordinates of the aimed point of the light gun 2, and a score of the shot game.

In other embodiments, the shot position determining system 24 may be installed in the host computer 5. In this situation, the light gun 2 transmits the current image captured by the image capturing device 20 to the host computer 5. The host computer 5 detects the screen area 40 in the current image, calculates the actual coordinates of the aimed point of the light gun 2 on the display screen 4 upon the condition that the screen area 40 has been detected, and displays the shot result on the display screen 4 according to the actual coordinates of the aimed point of the light gun 2 on the display screen 4.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for determining a shot position of a light gun on a display screen, the method comprising:
    obtaining a current image captured by an image capturing device of the light gun;
    detecting a screen area in the current image by comparing the current image with a screen template of the display screen, the current image comprising distance information between a lens of the image capturing device and each point of the screen area in the current image;
    calculating actual coordinates of the aimed point of the light gun on the display screen according to a virtual size of the screen area and an actual size of the display screen; and
    transmitting the actual coordinates to a host computer in response to receiving a shot command of the light gun, and displaying a shot result of the light gun on the display screen using the host computer according to the actual coordinates.

2. The method according to claim 1, wherein the screen template comprises a sub-image of a preset area enclosing the display screen and a reference distance between the lens of the image capturing device and the display screen in the preset area.

3. The method according to claim 2, wherein the reference distance is determined as a distance between the lens of the image capturing device and a feature point in the preset area.

4. The method according to claim 2, wherein the screen area is detected by:
    obtaining the reference distance from the screen template, a reference ratio between a width and a height of the preset area in the screen template, and a reference size of the preset area in the screen template;
    obtaining an image sub-area in the current image and a specified number of points in the image sub-area, and determining a current distance between each of the specified number of points and the lens of the image capturing device, a current ratio between a width and a height of the image sub-area, and a current size of the image sub-area; and
    determining that the image sub-area is the screen area upon the condition that each of the current distances is equal to the reference distance, the current ratio is equal to the reference ratio, and the current size is equal to the reference size.

5. The method according to claim 2, wherein the screen area is detected by:
    obtaining the reference distance from the screen template, a reference ratio between a width and a height of the preset area in the screen template, and a reference size of the preset area in the screen template;
    obtaining an image sub-area in the current image and a specified number of points in the image sub-area, and determining a current distance between each of the specified number of points and the lens of the image capturing device, a current ratio between a width and a height of the image sub-area, and a current size of the image sub-area; and
    determining that the image sub-area is the screen area upon the condition that a first deviation value between each of the current distances and the reference distance falls in a first preset range, a second deviation value between the current ratio and the reference ratio falls in a second preset range, and a third deviation value between the current size and the reference size falls in a third preset range.

6. The method according to claim 2, wherein the actual coordinates of the aimed point of the light gun on the display screen are calculated by:
    creating a virtual coordinate system of the screen area and obtaining virtual coordinates of the aimed point of the light gun in the screen area;
    creating an actual coordinate system of the display screen, and transforming the virtual coordinates to the actual coordinates of the aimed point of the light gun on the display screen according to a ratio between the virtual size of screen area and the actual size of the display screen.

7. A light gun, comprising:
a storage device;
at least one processor; and
one or more modules that are stored in the storage device and are executed by the at least one processor, the one or more modules comprising:
an image obtaining module that obtains a current image captured by an image capturing device of the light gun;
a screen area detection module that detects a screen area in the current image by comparing the current image with a screen template of the display screen, the current image comprising distance information between a lens of the image capturing device and each point of the screen area in the current image;
a coordinate calculation module that calculates actual coordinates of an aimed point of the light gun on a display screen according to a virtual size of the screen area and an actual size of the display screen; and
transmitting the actual coordinates to a host computer in response to receiving a shot command of the light gun, and displaying a shot result of the light gun on the display screen using the host computer according to the actual coordinates.

8. The light gun according to claim 7, wherein the screen template comprises a sub-image of a preset area enclosing the display screen and a reference distance between the lens of the image capturing device and the display screen in the preset area.

9. The light gun according to claim 8, wherein the reference distance is determined as a distance between the lens of the image capturing device and a feature point in the preset area.

10. The light gun according to claim 8, wherein the screen area is detected by:
obtaining the reference distance from the screen template, a reference ratio between a width and a height of the preset area in the screen template, and a reference size of the preset area in the screen template;
obtaining an image sub-area in the current image and a specified number of points in the image sub-area, and determining a current distance between each of the specified number of points and the lens of the image capturing device, a current ratio between a width and a height of the image sub-area, and a current size of the image sub-area; and
determining that the image sub-area is the screen area upon the condition that each of the current distances is equal to the reference distance, the current ratio is equal to the reference ratio, and the current size is equal to the reference size.

11. The light gun according to claim 8, wherein the screen area is detected by:
obtaining the reference distance from the screen template, a reference ratio between a width and a height of the preset area in the screen template, and a reference size of the preset area in the screen template;
obtaining an image sub-area in the current image and a specified number of points in the image sub-area, and determining a current distance between each of the specified number of points and the lens of the image capturing device, a current ratio between a width and a height of the image sub-area, and a current size of the image sub-area; and
determining that the image sub-area is the screen area upon the condition that a first deviation value between each of the current distances and the reference distance falls in a first preset range, a second deviation value between the current ratio and the reference ratio falls in a second preset range, and a third deviation value between the current size and the reference size falls in a third preset range.

12. The light gun according to claim 8, wherein the coordinate calculation module calculates actual coordinates by:
creating a virtual coordinate system of the screen area and obtaining virtual coordinates of the aimed point of the light gun in the screen area;
creating an actual coordinate system of the display screen, and transforming the virtual coordinates to the actual coordinates of the aimed point of the light gun on the display screen according to a ratio between the virtual size of screen area and the actual size of the display screen.

13. A non-transitory storage medium having stored thereon instructions that, when executed by a processor of a light gun, causes the light gun to perform a method for determining a shot position of the light gun on a display screen, the method comprising:
obtaining a current image captured by an image capturing device of the light gun;
detecting a screen area in the current image by comparing the current image with a screen template of the display screen, the current image comprising distance information between a lens of the image capturing device and each point of the screen area in the current image;
calculating actual coordinates of the aimed point of the light gun on the display screen according to a virtual size of the screen area and an actual size of the display screen; and
transmitting the actual coordinates to a host computer in response to receiving a shot command of the light gun, and displaying a shot result of the light gun on the display screen using the host computer according to the actual coordinates.

14. The non-transitory storage medium according to claim 13, wherein the screen template comprises a sub-image of a preset area enclosing the display screen and a reference distance between the lens of the image capturing device and the display screen in the preset area.

15. The non-transitory storage medium according to claim 14, wherein the reference distance is determined as a distance between the lens of the image capturing device and a feature point in the preset area.

16. The non-transitory storage medium according to claim 14, wherein the screen area is detected by:
obtaining the reference distance from the screen template, a reference ratio between a width and a height of the preset area in the screen template, and a reference size of the preset area in the screen template;
obtaining an image sub-area in the current image and a specified number of points in the image sub-area, and determining a current distance between each of the specified number of points and the lens of the image capturing device, a current ratio between a width and a height of the image sub-area, and a current size of the image sub-area; and
determining that the image sub-area is the screen area upon the condition that each of the current distances is equal to the reference distance, the current ratio is equal to the reference ratio, and the current size is equal to the reference size.

17. The non-transitory storage medium according to claim 14, wherein the screen area is detected by:
obtaining the reference distance from the screen template, a reference ratio between a width and a height of the preset area in the screen template, and a reference size of the preset area in the screen template;
obtaining an image sub-area in the current image and a specified number of points in the image sub-area, and determining a current distance between each of the specified number of points and the lens of the image capturing device, a current ratio between a width and a height of the image sub-area, and a current size of the image sub-area; and determining that the image sub-area is the screen area upon the condition that a first deviation value between each of the current distances and the reference distance falls in a first preset range, a second deviation value between the current ratio and the reference ratio falls in a second preset range, and a third deviation value between the current size and the reference size falls in a third preset range.

18. The non-transitory storage medium according to claim 14, wherein the actual coordinates of the aimed point of the light gun on the display screen are calculated by:

creating a virtual coordinate system of the screen area and obtaining virtual coordinates of the aimed point of the light gun in the screen area;

creating an actual coordinate system of the display screen, and transforming the virtual coordinates to the actual coordinates of the aimed point of the light gun on the display screen according to a ratio between the virtual size of screen area and the actual size of the display screen.

* * * * *